July 9, 1968  A. A. CONNELLIS  3,391,578
MEASURING SPOON
Filed Dec. 29, 1966
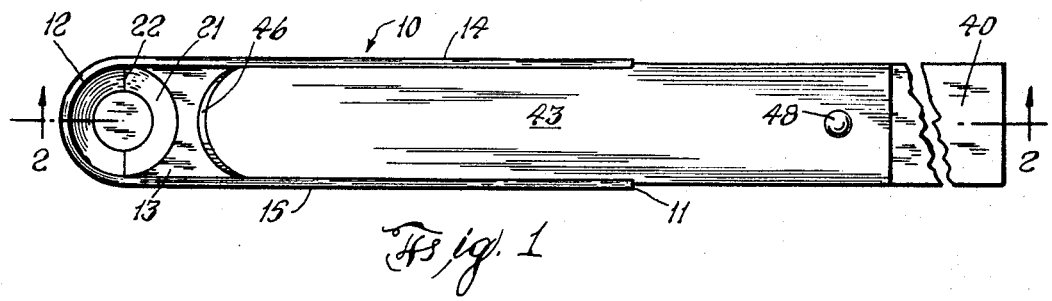
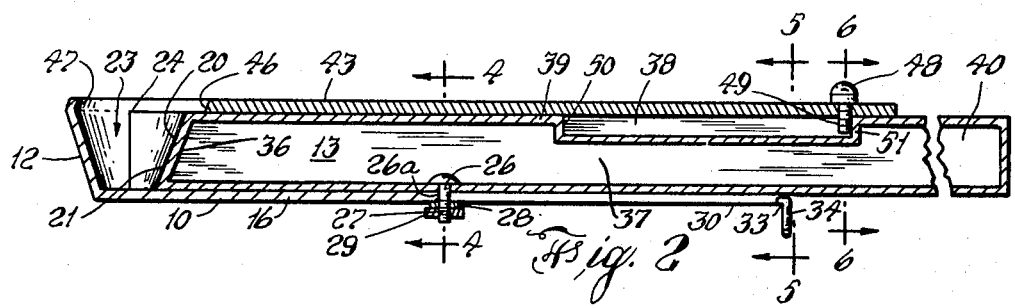
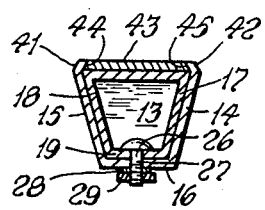 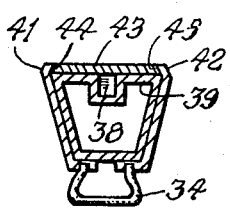 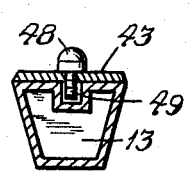
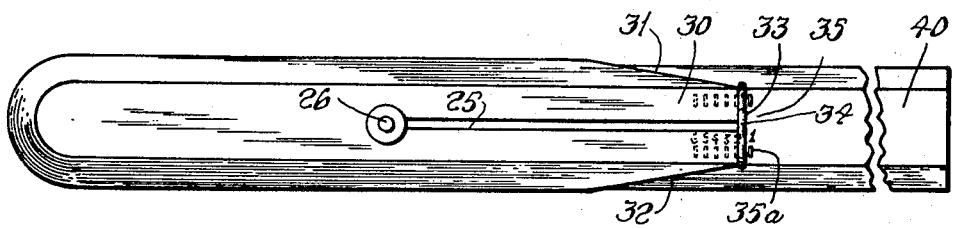
INVENTOR.
ARTHUR A. CONNELLIS

United States Patent Office

3,391,578
Patented July 9, 1968

3,391,578
MEASURING SPOON
Arthur A. Connellis, 7619 5th Ave.,
New York, N.Y. 10037
Filed Dec. 29, 1966, Ser. No. 605,802
6 Claims. (Cl. 73—429)

ABSTRACT OF THE DISCLOSURE

The adjustable measuring device disclosed herein includes a channelled hollow frame holder which carries for sliding relative movement therein a measuring guide therein. The walls of the guide and the end of the holder form a generally frusto-conical cavity when closed. The indexed movement of the guide toward and away from the end of the holder provides a measuring cavity. The cavity opening is closed by a strike slide which is also carried by the holder and is free to close and open across the cavity. Means are provided to lock the position of the guide within the holder thereby fixing the cavity volume. Specifically the operating end of the slide is beveled to mate with an undercut in the upper inner wall of the holder end so as to provide a positive closure. The device is operable with one hand and the material disposed in the cavity can be transported without spilling and turned over before the slide is retracted to drop the contents into the intended place.

Background of invention (1) This invention relates to measuring devices and more particularly to adjustable measuring devices for granular materials which may be scooped up, secured therein, transported and deposited at some distant location.

(2) Prior art measuring devices of this character are generally of several types, namely those employing separate spoon-like structures, those which are adjustable but do not permit their being turned over or tipped in handling, and those which are complex, bulky, difficult to operate, and not easily disassembled.

Summary of invention

The invention herein contemplates a measuring spoon which includes a hollow inner measuring guide sliding carried by a holder. The ends of the holder and guide cooperate to provide a frusto-conical cavity which is adjustable to contain a selected amount of granular material. A strike slide having a bevelled edge which mates with the upper edge of the holder securely closed off the cavity and is operatable with one hand. Stops, locking members and handles are provided for both the guide and the strike slide to facilitate ease of operation as well as ease of disassembly and cleaning.

It is, therefore, an object of this invention to provide a simple, inexpensive, reliable device for accurately measuring and transporting selectable quantities of granular materials.

Another object is to provide a measuring device which can be used with one hand and still retain its ease of operation while requiring only a minimum of manual dexterity.

A further object is to provide a measuring device which is compact, rugged, durable and having a minimum of component parts which are readily assembled and disassembled for cleaning by the ordinary household user thereof.

Other objects and advantages will appear from the following description of an example of the invention, and the novel features will be particularly pointed out in the appended claims.

Brief description of drawings

In the accompanying drawings
FIGURE 1 is a top plan view of an embodiment made in accordance with the principles of this invention;
FIGURE 2 is a side view in cross-section taken approximately along 2—2 of FIGURE 1;
FIGURE 3 is a bottom plan view of the embodiment of this invention;
FIGURE 4 is another cross-section view taken approximately along line 4—4 of FIGURE 2;
FIGURE 5 is still another cross-sectional view taken approximately along line 5—5 of FIGURE 2; and,
FIGURE 6 is still another cross-sectional view taken approximately along line 6—6 of FIGURE 2.

Description of preferred embodiment

In the embodiment of the invention of FIGURES 1 and 2 a generally U-shaped channel holder 10 which is open at one end 11 and closed at the opposite end by a hemi-conically shaped wall 12 carries for relative sliding movement therein a measuring guide 13. The holder 10 is formed with tapered or downwardly converging walls 14 and 15 joined to a base 16. For ease, lightness and simplicity of fabrication, the measuring guide 13 is made hollow and is entirely closed. The side walls 17 and 18 of the guide are also converging and abut for sliding contact the inner wall surfaces of holder 10 as does the guide base 19 with base 16 of the holder.

The forward or operating end 20 of the guide 13 has its wall 21 in the shape of a hemi-conical section of the same proportions as the holder wall 12. When the edges of the guide are as far forward as possible as at 22 the volume or space 23 disposed between the guide and holder is approximately frusto-conical with the upper face portion 24 open. The capacity of this space 23 is selected in arranging the physical proportions and structure of the guide and holder. This, of course, represents the smallest measurable quantity possible with the instant device and may be the order of a teaspoon. This frusto-conical configuration provides an efficient chamber with respect to capacity and one that is easily filled by scooping.

The base 16 of the holder 10 is provided with a central longitudinally extending slot 25 (see FIGURE 3) from about the middle of the holder to edge 33. The base 19 of the guide carries an aligning and locking member centrally thereof which extends therethrough and into the holder slot 25. This member may be a pin which is integral with the guide, or as shown, a screw 26 fastened to or held at the guide base passing through a hole 26a therein and having its threaded portion 27 extending through and beyond the slot 25. This threaded portion carries a lockwasher 28 or any other suitable element and a nut 29 threaded thereon. The screw 26 rides with the guide 13 in the slot 25 and can be adjustably secured in any desired position by tightening the nut 29 whose outer surface for convenience may be knurled.

That portion 30 of the base 16 of the holder 10 which extends further rearwardly than the side walls 14 and 15 (see FIGURE 3) has inwardly convergingly tapered edges 31 and 32 which terminate at edge 33. Across this edge 33 is disposed a ring or loop handle 34 which may be in almost any form, as for example, a U-shaped ring whose ends are embedded or recessed and secured into the base 16. The outer surface of base 19 of the guide is provided with indicia 35 marked thereon and easily viewed from below when the adjustment of the gudie is made via screw 26. These indicia represent the volumetric capacity of the space 23 in any convenient scalar value (i.e. teaspoon, tablespoon etc.) or values or combinations thereof. A device fabricated in accordance with this invention will measure accurately by means of the index fractions of teaspoons since the indicia consist of marked grooves 35a with which the edge 33 may be easily registered. The registration therewith of the edge 33 or the handle 34 indicates the capacity.

The guide 13 comprises for explanatory purposes three general portions. A forward portion which includes the operating and measuring end 36, a central portion 37 which includes the base hole 26a, the screw 26 and a recessed longitudinal channel 38 in the upper face 39 of the guide. The rear portion includes the indicia markings 35 and a handle 40. The handle is illustrated without any details therefor which is ordinarily formed to fit comfortably in the hand of a user. This showing has been deleted in view of the fact such configurations are well known and readily available.

Referring now to FIGURES 4 and 5, it should be observed that the converging walls 14 and 15 of the holder 10 are each provided with an inwardly directed upper sections 41 and 42 which form therebetween a confining channel in which strike slide 43 rides. The outer longitudinal edges 44 and 45 of the strike slide are bevelled so as to provide a sliding contact with the inner surfaces of sections 41 and 42. Additionally, it should be noted that since the walls 14 and 15 of the holder converge the strike slide cannot be displaced. The forward edge 46 of the strike slide is also bevelled and rounded so as to provide a smooth cutting surface as well as to positively abut the inner upper surface 47 of the holder with which it mates when the strike slide is in its closed position. The rear portion of the strike slide carries a finger grip 48 which extends therethrough. The depending end 49 thereof rides in the recessed channel 38. The shoulders 50 and 51 of this channel act as stops for the strike slide. The grip 48 has been illustrated in the form of a screw which is threaded into a hole in the strike slide simply as one easily fabricated embodiment.

Summarizing the overall operation, the amount of material to be dispensed (measured) is set by adjusting the measuring guide and thereby the capacity of the forward cavity. The strike guide is moved back so as to expose the measuring cavity. The operating end of the measuring spoon is then inserted into the material to be dispensed so as to fill the cavity such as by scooping, and it is then removed and the strike guide closed over the opening so as to strike off any excess material and thereby provide an accurate measure. With the strike guide closed, the device is carried to and disposed over the area into which the material is to be dispensed. As for example, this may be a cup and the material, powdered instant coffee. With the opening facing downwardly, the strike guide is retracted and the material allowed to fall into the cup. This entire operation may be accomplished simply with the use of one hand. Additionally, it should be noted that the entire measuring spoon can be disassembled into three separate sections for easy cleaning. This is accomplished simply by loosening the knurled nut 29, which has been peened so as to prevent its entire removal.

It will be understood that various changes in the details, materials, and arrangements of parts (and steps), which have been herein described and illustrated in order to explain the nature of the invention, may be made by those skilled in the art within the principle and scope of the invention as expressed in the appended claims.

What is claimed is:
1. A measuring spoon comprising:

a generally U-shaped channel member closed at one end by a hemi-conical downwardly converging end wall and having inwardly tapered sidewalls terminating in a base, a closed, elongated measuring guide, having converging sidewalls and a base and being slidably carried in and with a handle portion thereof extending beyond said channel member, a hemi-conical end wall thereof disposed opposite said end wall of said member forming therebetween a generally frusto-conical cavity, the upper wall of said guide being formed with a lengthwise recess central thereof, locking means carried by said guide for selectively fixing the position of said guide relative to said member, said locking means being a depending screw carried by said base of said guide and passing through and beyond a longitudinally extending slot in said base of said member and having affixed thereto a nut for selectively locking said member and said guide, a strike slide carried by said member closing the opening across said member and longitudinally slidable thereacross so as to selectively closed said cavity, including a finger grip carried by said strike slide also having a depending portion extending beyond said slide and riding in said recess whereby the abutments formed by the ends of said recess will limit the travel of said strike slide, retaining means for holding said strike slide in sliding, abutting relation above said guide, the outer face of said base of said guide being formed with volumetric indicia whereby when one of said indicia is in registration with the edge of said member base it indicates the volume of said cavity.

2. The measuring spoon, according to claim 1, wherein the upper edge portions of said sidewalls of said member disposed above said guide upwardly converge confining said guide between said sidewalls of said member.

3. The measuring spoon, according to claim 2, wherein the longitudinal edges of said strike slide are bevelled so as to slidingly abut the said inner upper edge portions of said sidewalls of said member.

4. The measuring spoon, according to claim 3, wherein the upper edge of said endwall of said member converges upwardly and the end edge of said strike slide proximate said cavity is bevelled so as to tightly abut said upper edge of said endwall of said member when said slide is in its closed position across said cavity.

5. The measuring spoon, according to claim 4, wherein said guide is hollow.

6. The measuring spoon, according to claim 5, further including downwardly depending handle means carried by said base of said member proximate the end thereof distal said cavity.

References Cited
UNITED STATES PATENTS

| 575,020 | 1/1897 | Atteberry | 73—429 |
|---|---|---|---|
| 2,521,343 | 9/1950 | Chadwick | 73—429 |
| 2,882,732 | 4/1959 | Cercone | 73—429 |

FOREIGN PATENTS

| 520,673 | 2/1921 | France. |
|---|---|---|

S. CLEMENT SWISHER, *Acting Primary Examiner.*

D. E. CORR, *Assistant Examiner.*